(12) United States Patent
Lake et al.

(10) Patent No.: US 6,798,415 B2
(45) Date of Patent: Sep. 28, 2004

(54) RENDERING COLLISIONS OF THREE-DIMENSIONAL MODELS

(75) Inventors: Adam T. Lake, Portland, OR (US); Carl S. Marshall, Portland, OR (US); Daniel P. Horowitz, Issaquah, WA (US)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 09/887,882

(22) Filed: Jun. 21, 2001

(65) Prior Publication Data

US 2002/0196258 A1 Dec. 26, 2002

(51) Int. Cl.[7] .............................................. G06T 13/00
(52) U.S. Cl. ..................... 345/474; 345/473; 345/954; 345/958; 345/959
(58) Field of Search ............................ 345/473, 474, 345/419, 954, 958, 959, 420

(56) References Cited

U.S. PATENT DOCUMENTS

| | | | |
|---|---|---|---|
| 4,600,919 A | | 7/1986 | Stern |
| 5,124,914 A | | 6/1992 | Grangeat |
| 5,163,126 A | | 11/1992 | Einkauf et al. |
| 5,731,819 A | | 3/1998 | Gagne et al. |
| 6,057,859 A | | 5/2000 | Handelman et al. |
| 6,067,096 A | * | 5/2000 | Nagle .......................... 345/473 |
| 6,208,347 B1 | | 3/2001 | Migdal et al. |
| 6,337,880 B1 | | 1/2002 | Cornog et al. |
| 6,388,670 B2 | | 5/2002 | Naka et al. |

OTHER PUBLICATIONS

Lewis "Pose Space Deformation: A Unified Approach to Shape Interpolation and Skeleton–Driven Deformation" Centropolis, New Orleans, LA, 165–172.

Lasseter "Principles of Traditional Animation Applied to 3D Computer Animation" Pixar, San Rafael, California, 1987.

Thomas (Contributor) et al., "The Illusion of Life: Disney Animation" 47–51.

Hoppe, "Progressive Meshes" Microsoft Research, 99–108, http://www.research.microsft.com/research/graphics/hoppe/.

Popovic et al., "Progressive Simplicial Complexes" Microsoft Research, http://www.research.microsft.com/~hoppe/.

Hoppe "Efficient Implementation of progressive meshes" Coput. & Graphics vol. 22, No. 1, pp. 27–36, 1998.

Taubin et al., "Progressive Forest Split Compression" IBM T.J. Watson Research Center, Yorktown Heights, NY.

Cohen–Or et al., "Progressive Compression of Arbitrary Triangular Meshes" Computer Science Department, School of Mathematical Sciences, Tel Aviv, Israel.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

(List continued on next page.)

*Primary Examiner*—Mark Zimmerman
*Assistant Examiner*—Kimbinh T. Nguyen
(74) *Attorney, Agent, or Firm*—Fish & Richardson P.C.

(57) ABSTRACT

Rendering a three-dimensional model comprised of three-dimensional data defining a bone includes obtaining a point at which the bone intersects a collision surface, determining a correction factor for use in rotating the bone from the point to a position in front of the collision surface, and rendering the three-dimensional model, including the bone, using the correction factor.

24 Claims, 9 Drawing Sheets

OTHER PUBLICATIONS

Alliez et al., "Progressive Compression for Lossless Transmission of Triangle Meshes" University of Southern California, Los Angeles, CA, 195–202.

Chow "Optimized Geometry Compression for Real–time Rendering" Massachusetts Institute of Technology, Proceedings Visualization 1997, Oct. 19–24, 1997, Phoenix, AZ, 347–354.

Markosian "Real–Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "SKETCH: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applications, 29–37, 1995.

Raskar "Image Precision Silhouette Edges" University of North Carolina at Chapel Hill, Microsoft Research, 1999 Symposium on Interactive 3D Graphics Atlanta, GA, 135–231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Samet "Applications of spatial data structures: computer graphics, image processing, and GIS" University of Maryland, Addison–Wesley Publishing Company, 1060–1064, Reading, MA, Jun. 1990.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA.

Lee "Navigating through Triangle Meshes Implemented as linear Quadtrees" Computer Science Department, Center for Automation Research, Institute for Advanced Computer Studies, University of Maryland College Park, MD, Apr. 1998.

* cited by examiner

|   |   |   |    |
|---|---|---|----|
| 0 | 4 | 8 | 12 |
| 1 | 5 | 9 | 13 |
| 2 | 6 | 10| 14 |
| 3 | 7 | 11| 15 |

RENDERING COLLISIONS OF THREE-DIMENSIONAL MODELS

TECHNICAL FIELD

This invention relates to rendering collisions of three-dimensional (3D) models.

BACKGROUND

A 3D model includes a virtual skeleton, comprised of bones arranged in a hierarchical tree structure. Surrounding the bones are polygons, such as triangles, which represent the skin of the 3D model. Movement of the polygons is tied to the movement of the bones so that the 3D model approximates real-life movement when the bones are re-positioned.

When a bone-based 3D model collides with a surface, the resulting collision affects the position and shape of the model. That is, the model deforms in approximately the same manner as a corresponding real-life character based on the impact of the bones with the collision surface.

DESCRIPTION

Figure 1:
FIG. 1 is a view of a 3D model.
Figure 2:
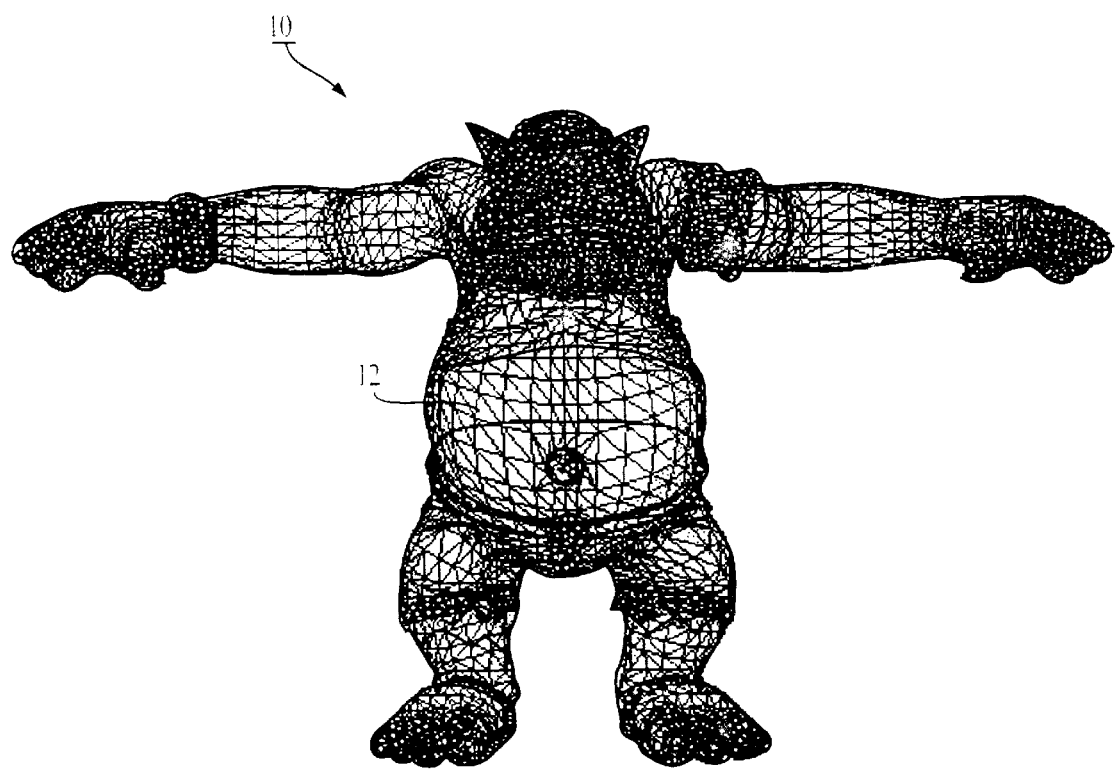
FIG. 2 is a view of polygons that make up the 3D model.

FIG. 1 shows a 3D model 10, which is rendered from 3D data. As shown in FIG. 2, 3D model 10 is comprised of interconnecting polygons 12. Polygons 12 are triangles in this embodiment; however, other types of polygons may be used. Polygons 12 define the "skin" surface of 3D model 10.

Figure 3:
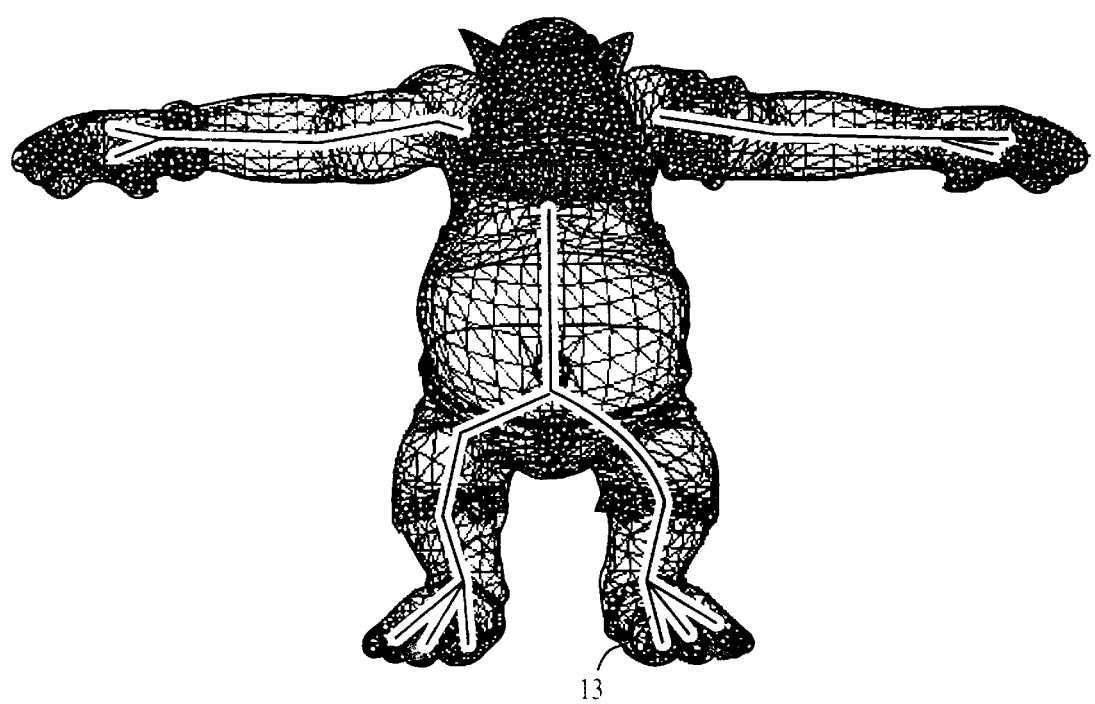
FIG. 3 is a view of bones that make up the 3D model.

The 3D data for model 10 also includes bone data. The bone data defines a rigid skeletal structure of model 10, which corresponds to the bones of a living being. The "bones" 13 of model 10 are Cartesian XYZ-space vectors in the 3D data (FIG. 3). The bone data defines a magnitude of the XYZ-space vectors and an orientation in XYZ-space of the vectors.

The bones of model 10 are linked together in a tree-like hierarchical structure, with "child" bones branching off from "parent" bones. Vertices of polygons 12 are associated with one or more bones such that motion of the bones is tied to motion of the polygons. The association is defined in the 3D data that makes up 3D model 10. Thus, a polygon deforms around a bone that the polygon is associated with, much the same way that skin surrounding living bone deforms in response to an applied force, such as a collision. The bones may change location in response to force, but do not change shape.

The movement of 3D model 10 is defined by a sequence of frames, which constitute snapshots of the 3D model at intervals of time. Each frame contains information about the position of a bone in 3D space at a particular instant in time. This information includes the displacement of the start of the bone from the end of its parent bone, the orientation of the bone relative to the orientation of its parent bone, one or more scaling factors that define the scale of the bone in 3D space, and the time of the displacement, orientation and scaling. Displacement and scale are represented as 3D vectors (e.g., Cartesian XYZ-space vectors). Orientation may be represented by rotation data, such as rotation matrices, Euler angles, or unit magnitude quaternions.

A quaternion is a scalar number that has the form $$q=w+xi+yj+zk,$$

where i, j and k are imaginary numbers such that $$ii=jj=kk=-1 \text{ and } ij=k,$$

and where w, x, y and z are real numbers.

Imaginary numbers i, j and k correspond to Cartesian X,Y and Z axes, respectively. Thus, to change the orientation of the bone in the X-axis/i direction, the value of "x" is changed in the quaternion "q". To change the orientation of the bone in the Y-axis/j direction, the value of "y" is changed in the quaternion "q". To change the orientation of the bone in the X-axis/k direction, the value of "z" is changed in the quaternion "q". The displacement and scale vectors noted above may also need to be changed.

Quaternions are used in this embodiment to define the collision of a 3D model with a plane, called a "collision surface". Generally speaking, real-time collision deformation of bones-based 3D models introduces flexibility into animation systems by automatically altering a model's animation sequences during a collision with an object in the model's environment. The process described herein manipulates a 3D model's skeletal structure to simulate a real-life object's collision with a surface.

Utilizing the rigid bones of the 3D model during a collision maintains the model's fundamental shape. The general bones-based animation of the 3D model is used to identify a target position for the model. However intersections with a collision surface will affect the positions of bones in the 3D model before the bones reach the target position. That is, the bones in the model are adjusted to prevent the bones from passing through the collision surface, thus simulating collision.

Deformations of the model in response to colliding with the surface are calculated based on the mechanics of the bone structure controlling the model. For example, as a biped (human-like) model collides with a wall, the model will lay flat with the surface of the wall. The results of automatic collision deformations produce more life-like dynamics in real-time simulations and reduce animator workload.

Figure 4:
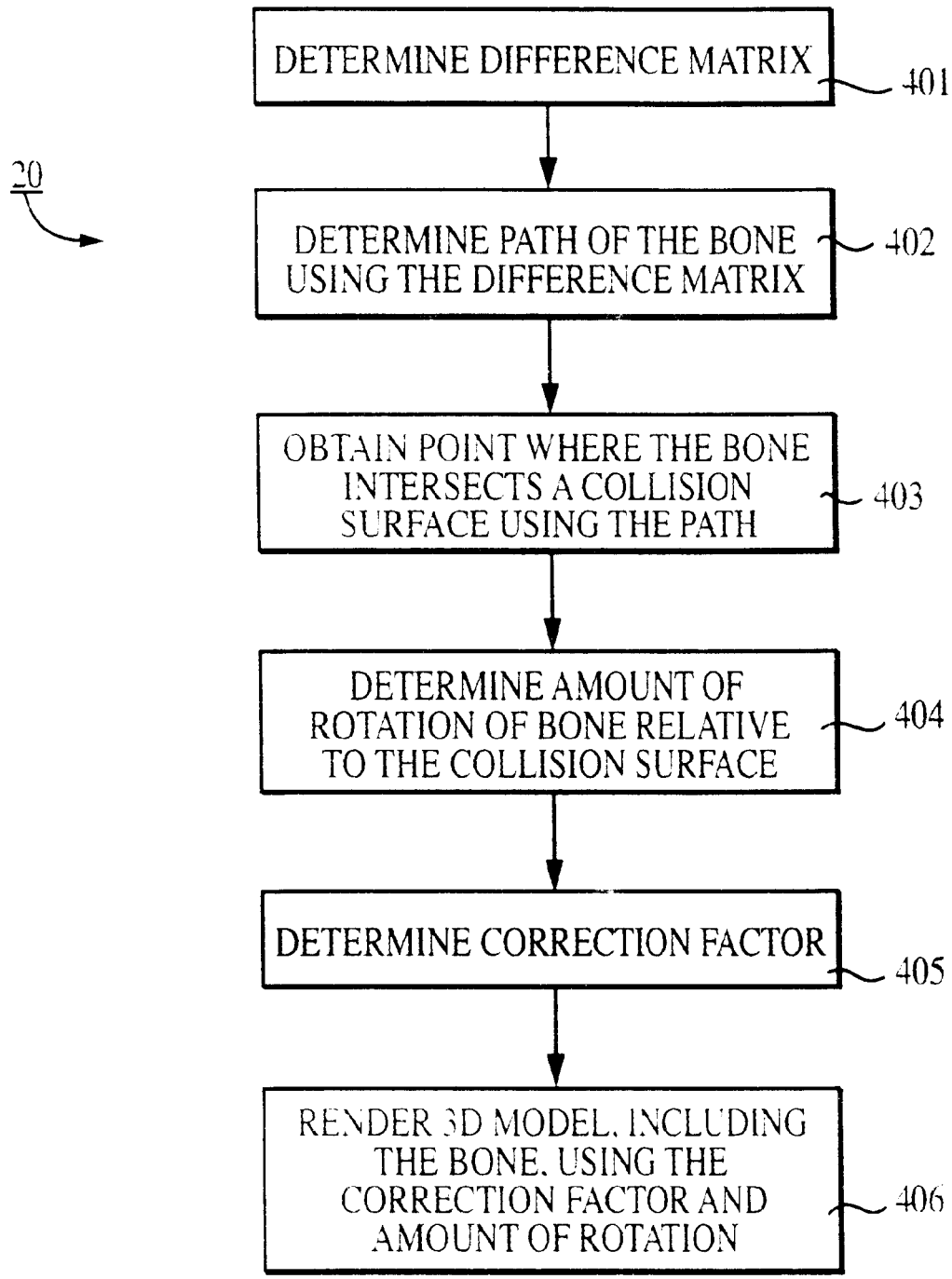
FIG. 4 is a flowchart showing a process for rendering a collision of the 3D model with a collision surface.

Referring to FIG. 4, a process 20 is shown for rendering collisions of a 3D model with a collision surface, such as a wall. Deforming a bones-based 3D model based on collisions with a surface is a time-dependent process that is based on an animation of the 3D model. Rather than using animation as an absolute position, process 20 uses differences between animation sequences. The target position of a bone in a 3D model is defined to be the full application of two consecutive animation frames' differences. A path from an initial position to the target position constitutes the interpolated curve that is determined using the difference.

To summarize, process 20 determines (401) a difference matrix by taking the difference between two animation sequences (e.g., frames) of a bone. Process 20 determines (402) an elliptical path that the bone follows using quaternion and translation (displacement) components of the difference matrix. Process 20 obtains (403) one or more points where the bone intersects the collision surface and determines (404) the amount (e.g., percentage) of rotation needed to prevent the bone from passing entirely through the collision surface while bringing the bone relatively close to the collision surface. Process 20 determines (405) an angle correction factor for use in rotating the bone from the intersection point with the collision surface to a position that is in front of the collision surface relative to the initial position.

Blocks 401 to 405 of process 20 are performed prior to effecting any movement in the 3D model. Once the information has been determined in 401 to 405, process 20 renders (406) the 3D model using that information. The resulting rendering approximates a collision of the 3D model with a collision surface in a relatively life-like manner.

In this embodiment, process 20 determines (401) the difference matrix of a bone by deriving a matrix $M_e$ that transforms the initial matrix $M_i$ (the matrix at the initial position of the 3D model) to the target matrix $M_d$ (the matrix at the target position of the 3D model). That is, $$M_e = M_i^{-1} * M_d$$

To determine (402) the path defining the change in animation of the 3D model, process 20 separates the difference matrix $M_e$ into a quaternion component and translation component.

Figures 5, 6:
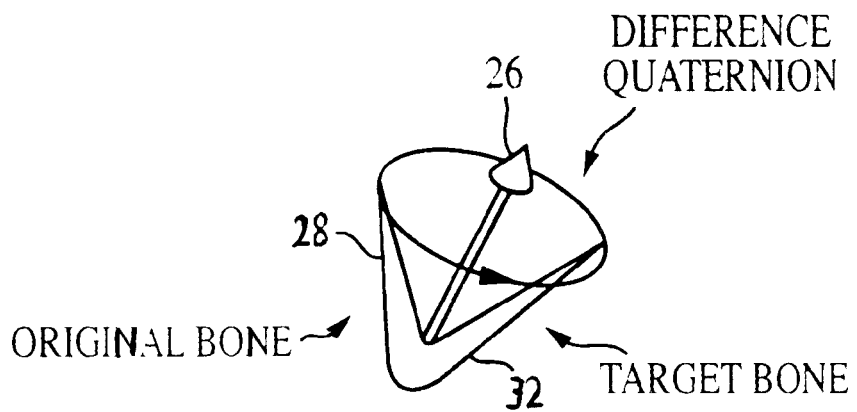
FIG. 5 is a matrix defining a change in position of a bone in the 3D model from an initial to a target position.
FIG. 6 is a view depicting rotation of the bone.
Figure 7:
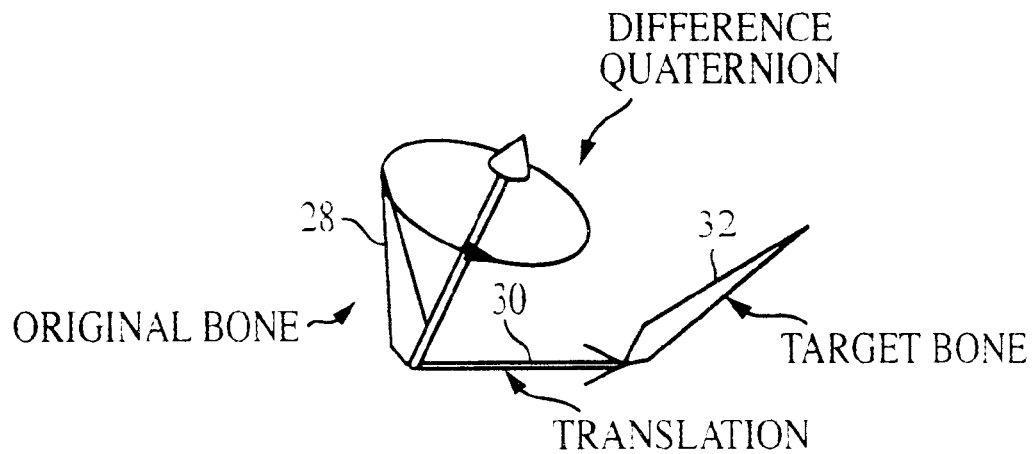
FIG. 7 is a view depicting translation of the bone.

Referring to the representative 4×4 matrix shown in FIG. 5, the quaternion component 22 is a 3×3 matrix and the translation component 24 is a 1×3 vector. As shown in FIG. 6, quaternion component 22 defines a quaternion 26 about which an original bone is rotated during movement from its initial position 28 to its target position 32. As shown in FIG. 7, the translation component 24 is a vector 30 that defines the magnitude and direction of lateral movement of the original bone from initial position 28 to target position 32.

Figure 8:
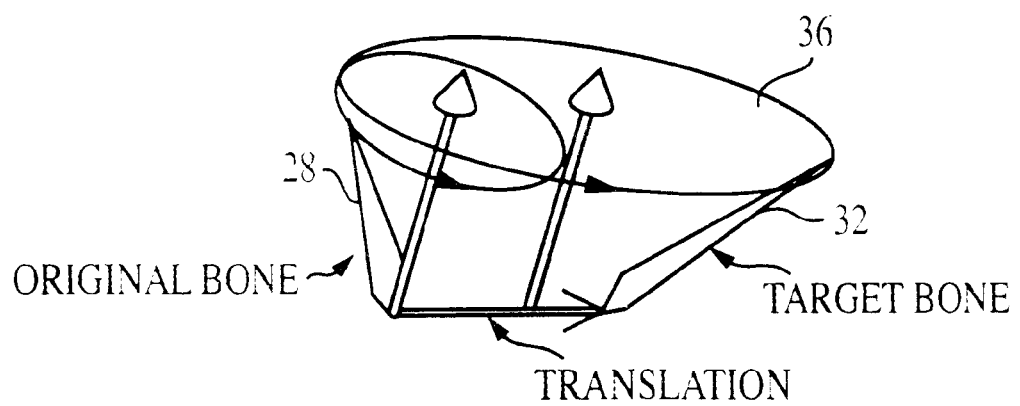
FIG. 8 is a view depicting an ellipse defined by both the rotation and translation of the bone.

Referring to FIG. 8, the resulting movement path of the bone from its initial position 28 to target position 32 is an ellipse 36. The ellipse is formed by first uniformly scaling the translation vector length (value range: 0 to length) and quaternion rotation (value range: 0 to $\pi$ radians) based on a percentage of interpolation along the ellipse. Adding the translation to the quaternion over the complete interpolation from 0 to 1 results in a half-ellipse. By symmetry, the whole ellipse is completed. The path provides a small margin of error when approximating small movements or large simple movement. Accuracy can be increased with more interpolative steps, which breaks the larger motion into smaller segments.

Figure 9:
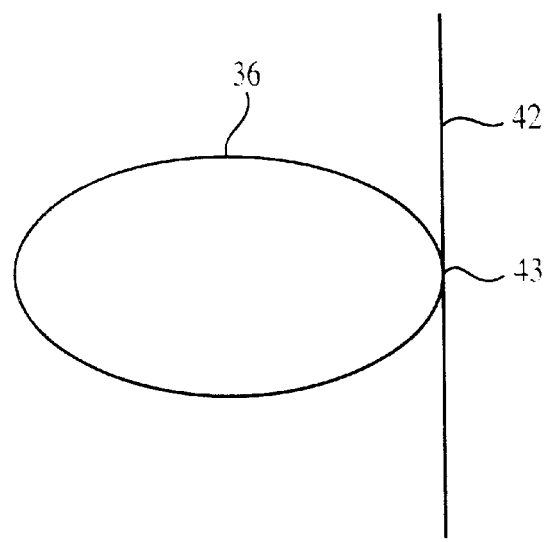
FIG. 9 is a view showing one point of the ellipse contacting a collision surface.
Figure 10:
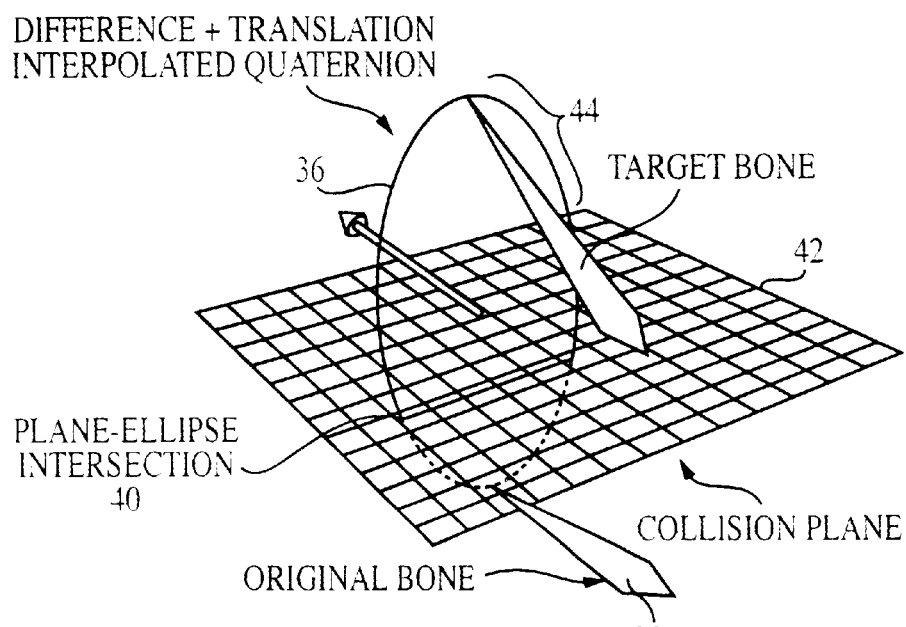
FIG. 10 is a view showing two points of the ellipse contacting the collision surface.

Process 20 obtains (403) the intersection point or points of the ellipse. If the ellipse just touches the collision surface 42, there is a single intersection point 43 (FIG. 9). If the ellipse penetrates the collision surface, two intersection points result (FIG. 10). In this embodiment, the ellipse is transformed from 3D (e.g., Cartesian XYZ) space into 2D (e.g., Cartesian XY) space. Transforming the ellipse from 3D space to 2D space reduces the complexity of the calculations performed to determine the intersection points.

In more detail, the ellipse is transformed to a space having the following properties: the ellipse lies parallel to the Cartesian XY-plane, a radial vector pointing to zero radians is parallel to the −Y axis, the axes are scaled so that the ellipse is transformed into a circle, and the intersection of the collision surface and Y axis is (0,0,0). Following the transformation, all relevant points are on an XY-plane. This simplified space allows the ellipse, bone, and collision surface to be handled in 2D. The ellipse can thus be represented by a center (dx,dy) with a radius of r (see FIG. 10). The intersection of the collision surface and the XY-plane creates a 2D function 44 with a slope of py/px and an intersection at point (0,0). If the ellipse intersects the collision surface, then the following equation solves for the x intercepts of a line 40:

$$x^2+y^2=r^2=(x-dx)^2+((py/px)*x-dy)^2.$$

The above equation may be simplified to a parabola, since the intersection of the ellipse with the collision surface results in an approximate parabolic function 44. The equations defining the resulting parabola are as follows:

$$Ax^2+Bx+C=0, \text{ where}$$

$$A=1+(py/px)^2$$

$$B=-2*(dx+dy*(py/px))$$

$$C=dx^2+dy^2-r^2$$

The following equation solves for the x-intercepts of the parabola.

$$x=(-B+/-(B^2-4AC)^{1/2})/2A$$

The corresponding y values of line 40 are determined by solving a planar equation that defines the collision surface, where x is each of the two solutions noted above and a z has a value of zero.

The planar equation is as follows:

$$Px+Qy+Rz+D=0,$$

where PQR are the XYZ coordinates of a normal to the plane and D is a distance factor associated with the plane.

Process 20 determines (404) an amount of rotation of the bone from its initial position 28 to a point at which the bone intersects the collision surface. The amount (percentage) of rotation of the bone along the ellipse is defined as $$((\pi/2)+\arctan2(y-dy, x-dx))\%(2*\pi),$$

where "%" is a "modulo". A modulo is the remainder of a quotient, e.g., the modulo of x%y is the remainder of x/y. The above equation takes the intersection point (x,y) of the bone path (circle) and the collision plane, subtracts the displacement of the path (dx, dy) to get a change relative to the origin of the circle, finds the angle of displacement of a point from the origin, and adds an initial starting angle ($\pi/2$) of the bone in radians to the result to obtain the amount of rotation of the bone.

If the amount of rotation is between zero and the angle of the ellipse's initial quaternion rotation, then it is considered to be a valid path intersection of the bone and the collision surface. If there is no intersection, then 100% interpolation is used (i.e., the bone is rotated to its final position 32 as defined by the target matrix).

Figure 12:
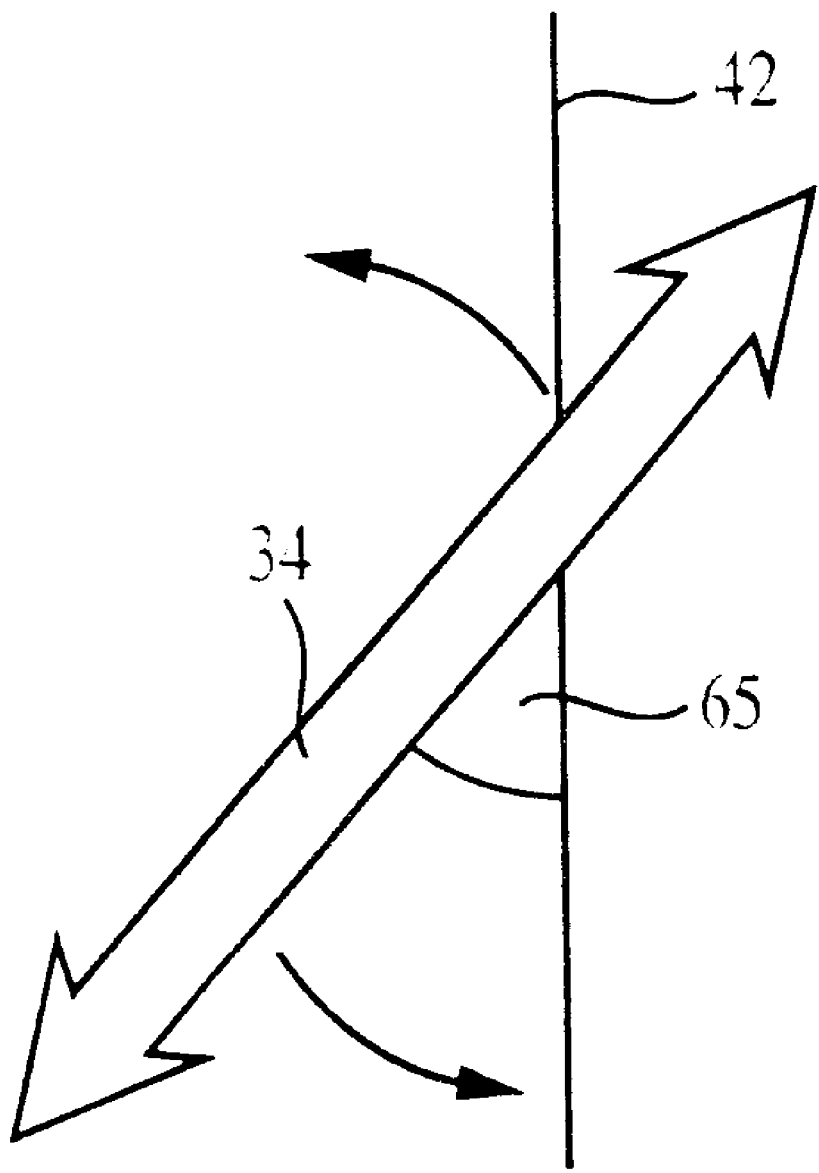
FIG. 12 is a view of the bone penetrating the collision surface.

If the bone collides with the collision surface during rotation, then the bone stops its movement early relative to its parent bone. In this case, the bone is moved back to a position at the front of its parent bone. This often places a bone 34 at intersection with the collision surface 42 (see FIG. 12). Accordingly, the bone is rotated relative to the collision surface in order to remove the bone from the collision surface and place it in front of the collision surface relative to its initial position. In addition to removing the bone, a best-fit bounding volume may be used to encapsulate most of the vertices attached to the bone.

A correction factor "AC" represents the angle change 65 (FIG. 12) needed to remove the bone to a position in front of the collision surface. Process 20 determines (405) the correction factor by finding the cosine of the angle between the bone and the collision surface as follows, where "BoneV" is a vector defining the direction of the bone, "BoneP" is a vector defining a base position of the bone, "Plane" is a vector defining the plane/surface normal, and "PlaneD" is a distance factor (D) of the plane in the planar equation representing the collision surface. The cosine of the angle between the plane and the bone is defined as $$cosAngle=(-\|Plane\|\cdot\|BoneV\|),$$

where "$\|\ \|$" refer to a normalized vector. If an end of the bone passed through the surface, then the bone is rotated so that the end point lies on the collision surface. The end of the bone is rotated at an angle defined by the angle correction factor AC. This angle correction factor is determined as follows:

$$PlanarTestEnd=(Plane\cdot(BoneP+BoneV))+PlaneD\ AC=arccos(planarTestEnd/|BoneV|)-arccos(cosAngle),$$

where "$|\ |$" is the length of a vector. If the bone base passed through the collision surface, rolling the bone along the surface during animation creates a follow-though effect in the animation. Process 20 projects the bone base onto the surface and rotates the bone vector according to the angle correction factor so that the bone still passes through its previous end point, as follows:

Project base onto surface $$projectBase=(Plane\cdot BoneP)*Plane$$

Get vector from projected base to endpoint.

$$NewBoneV=(BoneP+BoneV)-projectBase$$

Determine the new angle and final difference.

$$targetCosAngle=(-\|Plane\|\cdot\|NewBoneV\|)$$

$$currentAngle=acos(cosAngle);$$

$$targetAngle=acos(targetCosAngle)$$

$$AC=currentAngle-targetAngle$$

Once the bone has been rotated, process 20 transforms the bone and ellipse back into 3D space and renders (406) the bone in its new location in 3D space.

Figure 11:
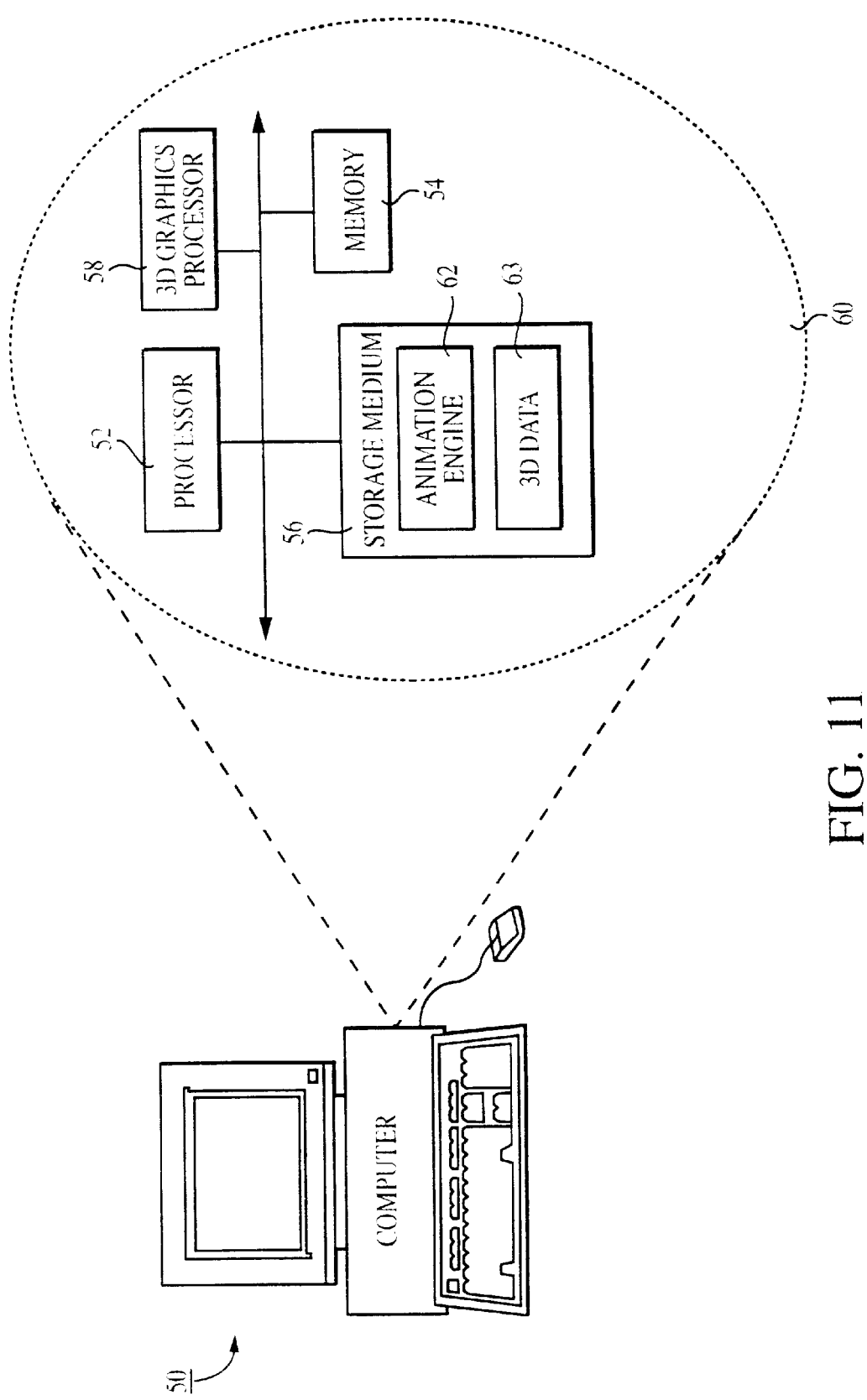
FIG. 11 is a view of computer hardware on which the process of FIG. 4 may be implemented.

FIG. 11 shows a computer 50 for rendering 3D models using process 20. Computer 50 includes a processor 52, a memory 54, a storage medium 56 (e.g., a hard disk), and a 3D graphics processor 58 for repositioning a 3D model and processing 3D data (see view 60). Storage medium 56 stores 3D data 62 which defines the 3D model, and machine-executable instructions (animation engine) 63, which are executed by processor 52 out of memory 54 to perform process 20 on 3D data 62.

Process 20, however, is not limited to use with the hardware and software of FIG. 11; it may find applicability in any computing or processing environment. Process 20 may be implemented in hardware, software, or a combination of the two. Process 20 may be implemented in computer programs executing on programmable computers that each includes a processor, a storage medium readable by the processor (including volatile and non-volatile memory and/or storage elements), at least one input device, and one or more output devices. Program code may be applied to data entered using an input device, such as a mouse or a keyboard, to perform process 20 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 20. Process 20 may also be implemented as a computer-readable storage medium, configured with a computer program, where, upon execution, instructions in the computer program cause the computer to operate in accordance with process 20.

Other embodiments not described herein are also within the scope of the following claims. For example, the foregoing describes the collision of a bone and a plane. However, the system can be modified to work with polygons and more complex surfaces than planes using, e.g., subdivision or the like. Polygon bound checking may be used to determine the intersection points in such embodiments.

What is claimed is:

1. A method of rendering a three-dimensional model comprised of three-dimensional data defining a bone, the method comprising:

obtaining a point at which the bone intersects a collision surface;

determining an amount of rotation of the bone from an initial position to the point at which the bone intersects the collision surface:

determining a correction factor for use in rotating the bone from the point at which the bone intersects the collision surface to a position in front of the collision surface, wherein the correction factor corresponds to a percentage of rotation along a path of the bone; and rendering the three-dimensional model, including the bone, using the correction factor.

2. The method of claim 1, wherein obtaining the point comprises:

determining the path of the bone; and locating a point at which the path intersects the collision surface.

3. The method of claim 2, wherein the path of the bone is determined based on a difference between a current position of the bone and a target position of the bone.

4. The method of claim 3, wherein the difference comprises a difference between a matrix defining a current position of the bone and a matrix defining a target position of the bone.

5. The method of claim 3, wherein:

the difference is defined by a matrix that includes a quaternion component and a translation component; and the path comprises an ellipse defined by the quaternion component and the translation component.

6. The method of claim 4, wherein the point is derived from a geometric approximation of a portion of the ellipse.

7. The method of claim 6, further comprising:
transforming the ellipse into two-dimensional space;
deriving the point in the two-dimensional space; and
rotating the bone in the two-dimensional space.

8. The method of claim 1, wherein the correction factor is defined by a target matrix for rotating the bone relative to the collision surface.

9. The article of claim 1, wherein obtaining the point comprises:
determining the path of the bone; and
locating a point at which the path intersects the collision surface.

10. The article of claim 9, wherein the path of the bone is determined based on a difference between a current position of the bone and a target position of the bone.

11. The article of claim 10, wherein the difference comprises a difference between a matrix defining a current position of the bone and a matrix defining a target position of the bone.

12. The article of claim 10, wherein:
the difference is defined by a matrix that includes a quaternion component and a translation component; and
the path comprises an ellipse defined by the quaternion component and the translation component.

13. The article of claim 11, wherein the point is derived from a geometric approximation of a portion of the ellipse.

14. The article of claim 13, further comprising instructions that cause the machine to:
transform the ellipse into two-dimensional space;
derive the point in the two-dimensional space; and
rotate the bone in the two-dimensional space.

15. An article comprising a computer-readable medium that stores instructions for rendering a three-dimensional model comprised of three-dimensional data defining a bone, the instructions causing a machine to:
obtain a point at which the bone intersects a collision surface;
determin an amount of rotation of the bone from an initial position to the point at which the bone intersects the collision surface;
determine a correction factor for use in rotating the bone from the point at which the bone intersects the collision to a position in front of the collision surface, wherein the correction factor corresponds to a percentage of the rotation along a path of the bone; and
render the three-dimensional model, including the bone, using the correction factor.

16. The article of claim 15, wherein the comprises correction factor is defined by a target matrix for rotating the bone relative to the collision surface.

17. An apparatus for rendering a three-dimensional model comprised of three-dimensional data defining a bone, the apparatus comprising:
a memory that stores executable instructions; and
a processor that executes the instructions to:
obtain a point at which the bone intersects a collision surface;
determin an amount of rotation of the bone from an initial position to the point at which the bone intersects the collision surface;
determine a correction factor for use in rotating the bone from the point at which the bone intersects the collision surface to a position in front of the collision surface, wherein the crrection factor corresponds to a percentage of rotation along a path of the bone; and
render the three-dimensional model, including the bone, using the correction factor.

18. The apparatus of claim 1, wherein obtaining the point comprises:
determining the path of the bone; and
locating a point at which the path intersects the collision surface.

19. The apparatus of claim 18, wherein the path of the bone is determined based on a difference between a current position of the bone and a target position of the bone.

20. The apparatus of claim 19, wherein the difference comprises a difference between a matrix defining a current position of the bone and a matrix defining a target position of the bone.

21. The apparatus of claim 19, wherein:
the difference is defined by a matrix that includes a quaternion component and a translation component; and
the path comprises an ellipse defined by the quaternion component and the translation component.

22. The apparatus of claim 20, wherein the point is derived from a geometric approximation of a portion of the ellipse.

23. The apparatus of claim 22, wherein the processor executes instructions to:
transform the ellipse into two-dimensional space;
derive the point in the two-dimensional space; and
rotate the bone in the two-dimensional space.

24. The apparatus of claim 17, wherein the amount of rotation comprises a percentage of rotation correction factor is defined by a target matrix for rotating the bone relative to the collision surface.

* * * * *